United States Patent [19]

Walters

[11] Patent Number: 4,658,152

[45] Date of Patent: Apr. 14, 1987

[54] ADAPTIVE RATE MULTIPLEXER-DEMULTIPLEXER

[75] Inventor: Stephen M. Walters, Holmdel, N.J.

[73] Assignee: Bell Communications Research, Inc., Livingston, N.J.

[21] Appl. No.: 804,689

[22] Filed: Dec. 4, 1985

[51] Int. Cl.[4] .............................. H04J 3/22; H04J 3/00
[52] U.S. Cl. .......................................... 370/84; 370/99
[58] Field of Search ....................... 370/84, 112, 110.1, 370/79, 95, 85, 99

[56] References Cited

U.S. PATENT DOCUMENTS

| | | | |
|---|---|---|---|
| 3,207,851 | 9/1965 | Fukinuki | 370/99 |
| 3,692,942 | 9/1972 | Inose . | |
| 3,710,056 | 1/1973 | Tomozawa | 370/99 |
| 3,749,839 | 7/1973 | Fornasiero et al. | 370/99 |
| 3,970,799 | 7/1976 | Colton et al. | 370/110.1 |
| 3,982,074 | 9/1976 | Clark | 370/99 |
| 4,429,383 | 1/1984 | Finck et al. | 370/84 |
| 4,485,468 | 11/1984 | Slana | 370/84 |
| 4,504,943 | 3/1985 | Nagano et al. | 370/79 |
| 4,535,451 | 8/1985 | Drupsteen | 370/99 |
| 4,558,445 | 12/1985 | Novick | 370/84 |

OTHER PUBLICATIONS

Tokehisa Tokunaga, "Time Division Multiplexing of Signals with Plurality of Information Rates in Which Original Symbol Intervals of Individual Signals Are Preserved," *Electronics and Communications in Japan*, vol. 53-A., No. 12, Dec. 1970, pp. 35-43.

D. Sellier, "Programmable Variable Speed Scanner," *IBM Technical Disclosure Bulletin*, vol. 23, No. 6, Nov. 1980, pp. 2325, 2326.

B. Bowles et al., "EPROM Achieves Nonuniform Data-Channel Sampling," *Electronics*, vol. 51, No. 4, Feb. 1978, pp. 110-113.

*Primary Examiner*—Douglas W. Olms
*Assistant Examiner*—Curtis Kuntz
*Attorney, Agent, or Firm*—James W. Falk; Stephen M. Gurey

[57] ABSTRACT

A plurality of various rate digital subchannels are multiplexed onto a fixed rate channel by arranging the data bits from the subchannels into a framing structure consisting of j sets of i-tuples for ij bits per frame where the parameters i and j are mathematically determined as a junction of the rates of the subchannels and the rate of the fixed channel. Framing is maintained by setting each bit in the first i-tuple to ZERO and the last bit in each other i-tuple to ONE. A multiplexer-demultiplexer is described which is adaptive to the rates of the subchannels and the fixed channel in this frame structure and which can therefore be employed for any mix of subchannel and fixed channel rates. The multiplexer-demultiplexer includes a memory (204) for storing the bit assignment pattern for a frame structure configured for a particular mix of subchannel rates; plural subchannel interfaces (201-0--201-11) for storing bits directed to and from each channel and for clocking these bits onto and off the subchannels at their subchannel rates; and a kernel (203) which selects bits stored in the subchannel interfaces to form the multiplexed bit streams and distributes bits from the fixed channel to the subchannel interfaces in accordance with the stored bit assignment pattern. When a new bit assignment pattern is stored in the memory derived from a new combination of subchannel and fixed channel rates, the multiplexer-demultiplexer automatically adapts to the new frame structure and channel rates.

26 Claims, 9 Drawing Figures

FIG. 6
TRANSMIT CYCLE

FIG. 8
RECEIVE CYCLE

FIG. 9
RECEIVE CYCLE (LAST BIT)

4,658,152

ADAPTIVE RATE MULTIPLEXER-DEMULTIPLEXER

BACKGROUND OF THE INVENTION

This invention relates to apparatus for multiplexing and demultiplexing a plurality of various rate subchannels onto a fixed rate channel and more particularly to apparatus that is adaptive to different combinations of the subchannel and fixed channel rates.

In my co-pending patent application, Ser. No. 724,199, filed Apr. 17, 1985 now U.S. Pat. No. 4,617,658, entitled "Frame Arrangement for Multiplexing a Plurality of Subchannels onto a Fixed Rate Channel," I describe a framing structure which consists of j sets of i-tuples for ij bits per frame, the parameters i and j being mathematically determined as a function of the rates of the subchannels and the rate of the fixed channel. In $j-1$ of the i-tuples, $i-1$ bits are used for information and one bit at either end of the i-tulpes is set ONE (or ZERO). In one of the i-tuples, all i bits are set ZERO (or ONE). Framing is detected by monitoring for i successive ZEROes (or ONEs) followed or preceded by a ONE (or ZERO) which cannot occur elsewhere in the frame regardless of the data pattern. In the remaining $(i-1)(j-1)$ bit positions in the frame, an integral number of information bits from each subchannel are distributed so that the required rate for each subchannel is provided.

In my aforenoted patent application, I describe in detail a multiplexer and demultiplexer which can multiplex and demultiplex, respectively, any one combination of subchannel rates using this frame structure once the values of i and j are calculated and bit assignments made within the frame. As digital links connected directly to users proliferate, flexible multiplexing and demultiplexing equipment that can be adapted on a line to line basis to meet each individual user's data needs is needed to permit maximum bandwidth utilization. Furthermore, equipment that can provide different rate mixtures on one line is desirable to provide the user with the flexibility to rearrange his mixture of data channels.

SUMMARY OF THE INVENTION

The multiplexer-demultiplexer of the present invention adaptively multiplexes and demultiplexes a plurality of various rate subchannels on and off of a fixed rate channel in accordance with the particular parameters of the frame structure of the data, where these parameters are determined by the rates of the subchannels and the rate of the fixed channel. The multiplexer-demultiplexer structure includes a memory device which stores the bit assignment pattern for the frame; plural subchannel interfaces, each for clocking data in and out of the multiplexer-demultiplexer from and to a subchannel in response to an internally generated clock signal at the subchannel rate; and a kernel, connected to the fixed rate channel, the memory, and the plural subchannel interfaces, for controlling the flow of data from the subchannel interfaces to the output channel and from the output channel to the subchannel interfaces in response to the bit assignment pattern stored in the memory. In addition, the kernel generates a clock signal at a frequency determined as a function of the stored frame structure and which is employed by each subchannel interface to derive the clock signal for that subchannel. When the subchannel mixture is changed and a new frame structure derived from the subchannel rates and stored in the memory as a new bit assignment pattern, the multiplexer-demultiplexer of the present invention adapts to the new frame structure and automatically generates the clock signals at the new subchannel rates.

DETAILED DESCRIPTION

In my aforenoted co-pending patent application which I incorporate herein by reference, I define a frame structure for multiplexing a plurality of various rate subchannels onto a fixed rate channel. The frame structure, shown in FIG. 1, consists of j i-tuples in which all the bits in the first i-tuple are set ZERO and the last ith bit in each other i-tuple is set ONE. In each frame there are therefore $(i-1)(j-1)$ information bits. By examining the received data stream for a ONE followed by i ZEROes, framing is easily recovered if lost.

Figure 1:
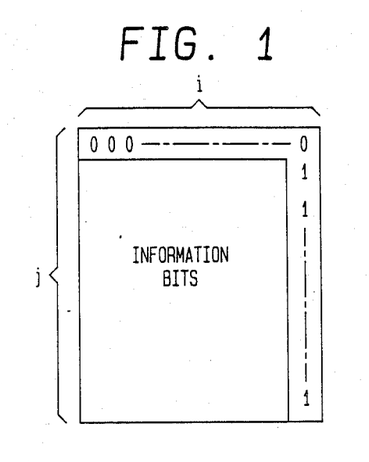
FIG. 1 is an illustration of the frame organization employed by the multiplexer-demultiplexer of the present invention and which contains j i-tuples of bits of which $(i-1)(j-1)$ are information bits.

As described in my aforenoted application, the parameters i and j can be calculated from the rates r(k) of the various subchannels and the rate of R of the common channel. A frame length $ij=xQ$ can be found for any combination of channel rates. In each frame of $ij=xQ$ bits, xp(k) bits are allocated to each of the subchannels and distributed in the $(i-1)(j-1)$ information bit positions, where $p(k)=Qr(k)/R$.

Once the frame structure is defined, the bit assignment pattern can be stored in a memory device as a series of instructions keyed to the bit position in the frame. These instructions can be used to select the appropriate next bit for transmission in the multiplexed stream as either a bit from a particular subchannel or a forced ONE or ZERO framing bit. Similarly these same instructions can be used to demultiplex a received multiplexed stream by directing the received bits to the appropriate subchannels and to detect framing by scanning the received bit stream for a ONE followed by i ZEROes.

As will be described in detail hereinafter, the multiplexer-demultiplexer of the present invention automatically adapts to the stored frame structure by generating from the bit assignment distribution, the clock signals r(k) necessary for clocking the data bits on and off the various subchannels.

Figure 2:
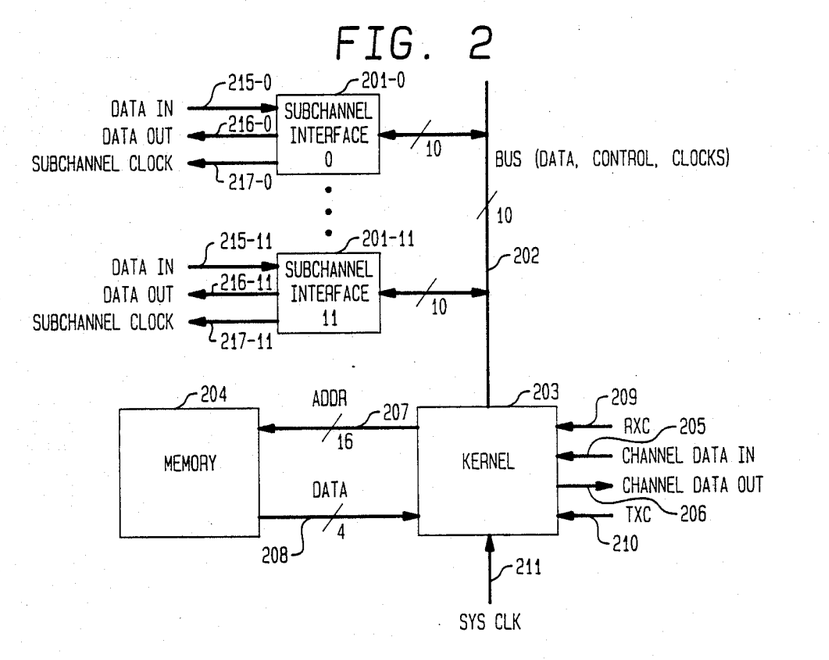
FIG. 2 is a block diagram of the adaptive rate multiplexer-demultiplexer of the present invention.

With reference to FIG. 2, the multiplexer-demultiplexer includes subchannel interfaces 201-0—201-11 for handling up to twelve subchannels. The subchannel interfaces 201-0—201-11 are connected by means of bus 202 to a kernel 203 which in turn is connected to memory 204, input channel 205 and output channel 206. Memory 204 has stored therein the bit assignment pattern for a particular set of subchannel and fixed channel rates and contains for each bit position in the frame, from the 1st to the ijth, the subchannel number to which or from which that numbered data bit is to be transmitted or received, or alternatively, whether that bit is a framing bit. For each framing bit, memory 204 stores one of three special codes that indicate whether that bit position in the frame is a ZERO, a ONE or the last ONE in the frame. In response to an address on ADDR leads 207 indicating the bit position in the frame, the memory 204 responds on DATA leads 208 with a four bit channel identification code that identifies one of the twelve subchannels or one of the aforenoted three special codes.

Kernel 203, to be described in detail hereinafter, functions as a traffic controller by accessing memory 204 and administering the transfer of bits, as specified by the memory's content, between the subchannels and the input and output channels 205 and 206. By maintaining a bit count within the frame in both the multiplex and demultiplex directions, kernel 203 supplies addresses in the form of bit counts on leads 207 to memory 204. The response of memory 204 on leads 208 is either a subchannel ID code or one of the aforenoted special codes. If a subchannel ID, kernel 203 alerts via bus 202 the identified subchannel interface and a bit is either inputted or outputted from that interface. If the memory response is a special code, kernel 203 inserts a forced ONE or ZERO in the multiplexed stream or compares the received bit with its expected value to determine whether there is an out-of-frame condition.

Each bit in the multiplexed bit stream from input channel 205 is clocked into kernel 203 in response to an external clocking signal RXC on lead 209. In response to each RXC clock pulse, kernel 203 increments its receive counter and retrieves from memory 204 the stored code associated with that bit position and distributes the bit. In the transmit direction, kernel 203 clocks each bit onto output channel 206 in response to external clocking signal TXC on lead 210. In response to each TXC pulse, kernel 203 increments its transmit counter and retrieves from memory 204 the stored code associated with that bit position and retrieves the next bit for transmission.

In addition to the transmitted and received data bits, bus 202 carries a clock signal which is internally derived by kernel 203 from the frame structure and which is used by each subchannel interface 201-0—201-11 to synthesize the subchannel clock frequency r(k). As will be described in detail hereinafter, these clock signals automatically adapt to new frame structures stored in the memory. Bus 202 also carries other clock and control signals, to be described hereinafter, which include an external system clock SYS CLOCK at a frequency substantially higher than the channel rate, and which is inputted to kernel 203 on lead 211 to rapidly effect processing of the stored codes within the kernel. In addition, SYS CLOCK is employed by the subchannel interfaces, 201-0—201-11.

Each subchannel interface 201-k accepts from its associated subchannel data input 215-k the serial data bits to be multiplexed and outputted on data output 206. Similarly, each subchannel interface 201-k provides to its associated subchannel data output 216-k demultiplexed data received on data input 205. In addition each subchannel interface 201-k generates the synchronous clock at the subchannel rate r(k) which is used internally within the subchannel interface to clock bits on and off the subchannel and is provided externally to the subchannel on 217-k. These clock signals, as will be described in detail hereinafter, are adaptively and automatically derived from the aforenoted clock signal generated by kernel 203. As will be described, each subchannel interface 201-k buffers the data bits addressed to it aperiodically on bus 202 from channel 205 and outputs these bits at the subchannel clock rate r(k). Similarly the input subchannel bits at the rate r(k) are buffered by the subchannel interface 201-k and outputted onto bus 202 aperiodically when kernel 203 addresses that subchannel for a bit.

Figure 3:
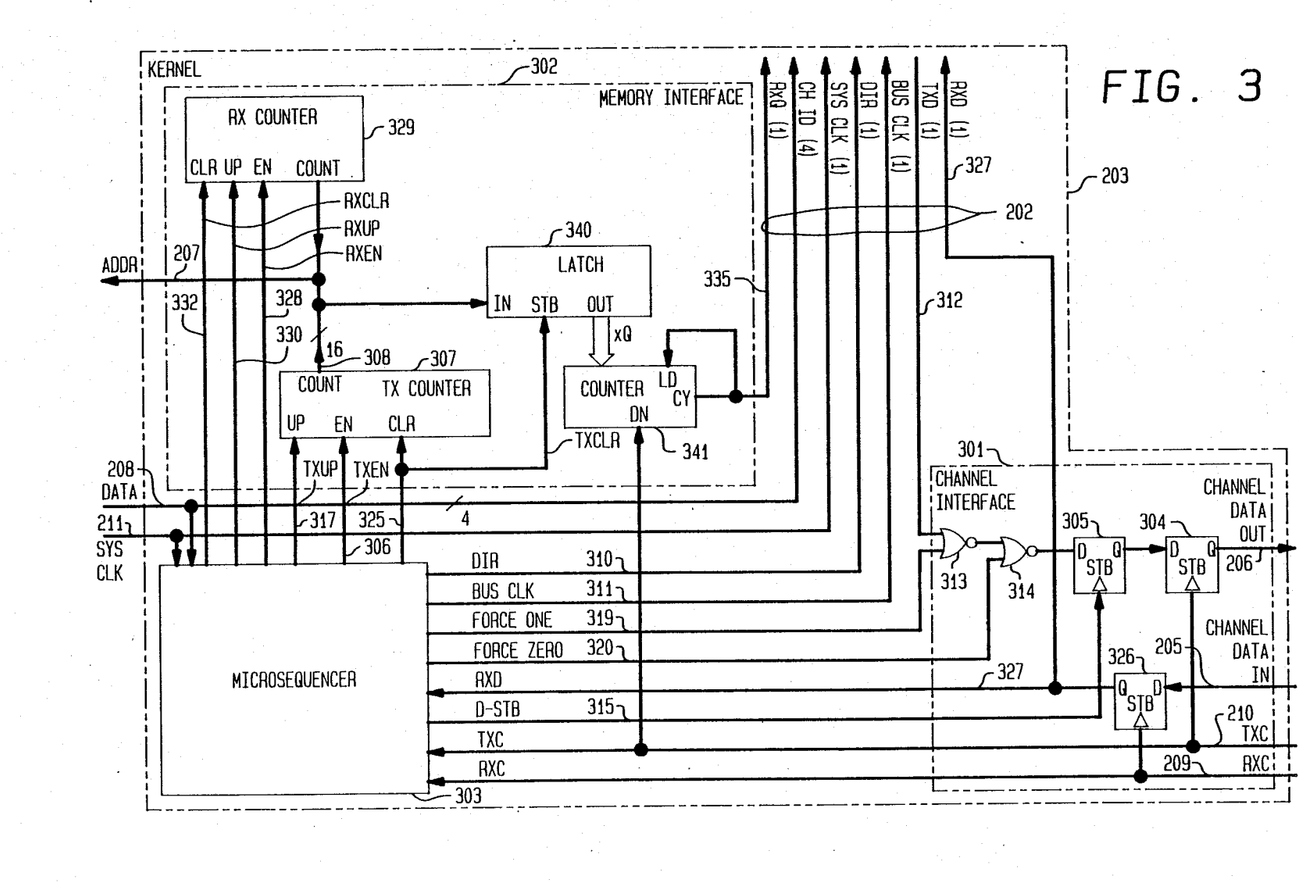
FIG. 3 is a block diagram of the kernel of the multiplexer-demultiplexer of FIG. 2.

Kernel 203 will be described in detail with reference to FIG. 3. The same numeric designations are given to those elements appearing in multiple figures. Kernel 203 includes channel interface 301, memory interface 302 and microsequencer 303. Connected to channel interface 301 are the input and output data channels 205 and 206, respectively, the RXC and TXC clock leads 209, and 210, respectively, microsequencer 303 and the bus 202. Memory interface 302 maintains a count of transmit and receive bits per frame which are provided, when requested, as address information on ADDR leads 207 to the memory device 204. Microsequencer 303, operating in response to the high speed system clock SYS CLOCK on lead 211 generates the control signals which supply address information to the memory 204; which signal the channel interface 301 to force a ZERO or a ONE in the transmit bit stream; and which are employed on bus 202 to signal a bit request or bit arrival.

The operation of the kernel is best understood in conjunction with the timing diagrams in FIGS. 6-9. In a normal transmit cycle, shown in FIG. 6, each TXC pulse on lead 210 strobes flip-flop 304 which outputs onto channel 206, as shown on "CH.DATAOUT" timing line, the data or framing "next bit" stored at the D input of flip-flop 304 and at the Q output of flip-flop 305. This same TXC pulse is simultaneously applied to microsequencer 303 which in response thereto, enables TXEN lead 306, as shown in "TXEN" timing line. TXEN lead 306, connected to the EN input of transmit TX counter 307, enables its present count from the COUNT output onto ADDR leads 207. The ADDR timing line represents the parallel transmission of this 16-bit count. Memory 204 (shown in FIG. 2) thereupon responds with a 4-bit word on DATA leads 208 indicating either a subchannel ID, or one of the three aforenoted special codes. This is noted on the DATA timing line where "SUBCH. ID" represents the 4-bit parallel memory response. This responsive DATA word, in addition to being available on the channel identification CH ID leads of bus 202 for transmission to the subchannel interfaces 201-0—201-11, is interpreted by microsequencer 303. Microsequencer 303 thereupon sets DIR lead 310 on bus 202 to ONE, as noted on DIR timing line, to indicate the direction of transmission on the channel (transmit-ONE, receive-ZERO). Microsequencer then enables BUS CLK lead 311, as noted on BUSCLK timing line, to notify the subchannel interfaces that valid CH ID and DIR data is present on bus 202.

Figure 6:
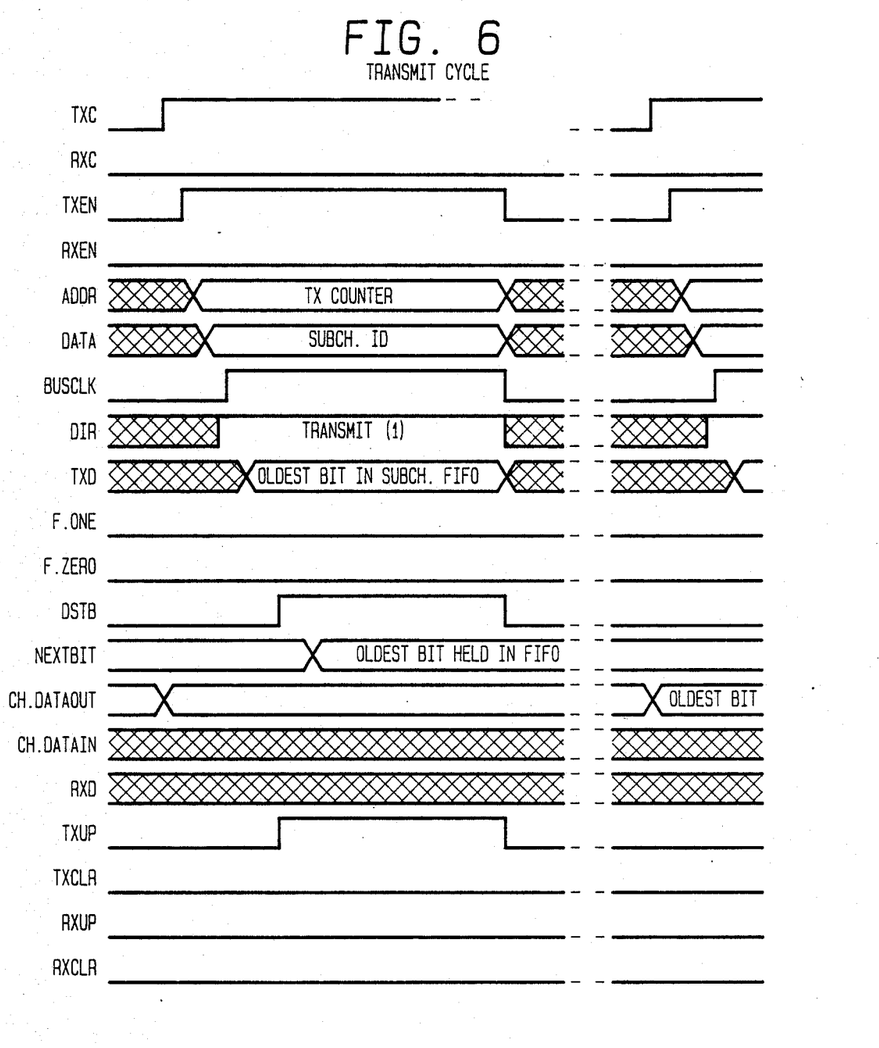
FIG. 6 shows the timing relationship between various memory, kernel and subchannel interface signals during a transmit cycle.

As will be described in detail hereinafter, the subchannel interface 201-k addressed by the subchannel code on the CH ID data leads 208 responds on TXD lead 312 with the oldest bit stored by that subchannel interface and which is entered at the D input of flip-flop 303 through NOR gates 313 and 314. TXD timing line illustrates this ONE or ZERO bit as the "oldest bit in subchannel FIFO". Microsequencer 303 subsequently enables D-STB lead 315, noted on DSTB timing line, to strobe flip-flop 305 thereby transferring this subchannel data bit to the "next bit" D input of flip-flop 304. The NEXTBIT timing line illustrates the transfer of the "oldest bit" from TXD lead 312 to this "next bit" input of flip-flop 304. Microsequencer 303 then pulses TXUP lead 317 connected to the UP input of TX counter 307 to increment its count, as noted in the TXUP timing line.

If rather than responding with a subchannel ID, memory 204 responds with one of the special codes that indicate that a framing ONE or ZERO is to be transmitted, then microsequencer 303 enables FORCE ONE lead 319 or FORCE ZERO lead 320, which are connected to NOR gates 313 and 314, respectively. A ONE or ZERO is registered at the input of flip-flop 305 and clocked into flip-flop 304 in response to the subsequent D-STB pulse. If the special code is not the code indicating last bit of the frame, then TXUP lead 317 is enabled and the count of TX counter 307 incremented.

Figure 7:
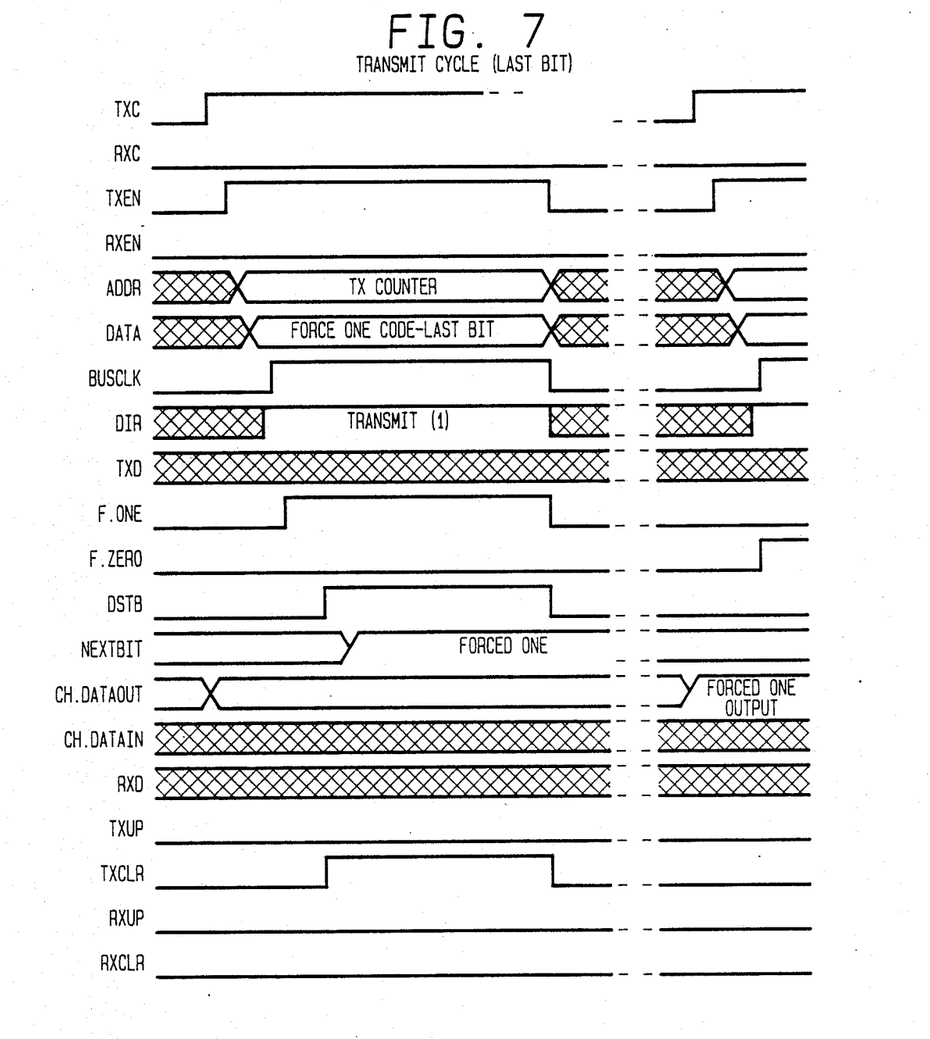
FIG. 7 shows the timing relationships between these various signals during the transmit cycle of the last bit in the frame.

FIG. 7 illustrates the timing relationship when memory 204 responds with the special code indicating the last bit in the frame. As noted on the DATA timing line, the DATA response is the "force-one code-last bit" from which microsequencer 303 enables FORCE ONE lead 319 (noted in the F.ONE timing line). In response thereto a ONE is registered in flip-flop 305 as noted in the NEXTBIT timing line. In addition, microsequencer 307 enables TXCLR output lead 325 (noted on TXCLR timing line) connected to the clear CLR input of TX counter 307 which thereupon clears the count to ZERO.

After microsequencer 303 enables D-STB lead 315 and the bit at the D input of flip-flop 305 is latched to its Q output, whether that bit is a subchannel bit or a forced ONE or ZERO bit, all transmit bit processing is complete. Microsequencer 303 disables TXEN lead 306 and this "next bit" now stored at flip flop 305 is ready to be latched out of flip-flop 304 onto output channel 206 in response to the next TXC pulse on lead 210. Thus as can be noted in FIGS. 6 and 7 on the CH.DATAOUT timing lines, the previously processed "oldest bit" or "forced one" bit is outputted in response to the leading edge of this next TXC pulse. Before this next TXC pulse, however, kernel 203 will process a receive bit from input channel 205.

Figure 8:
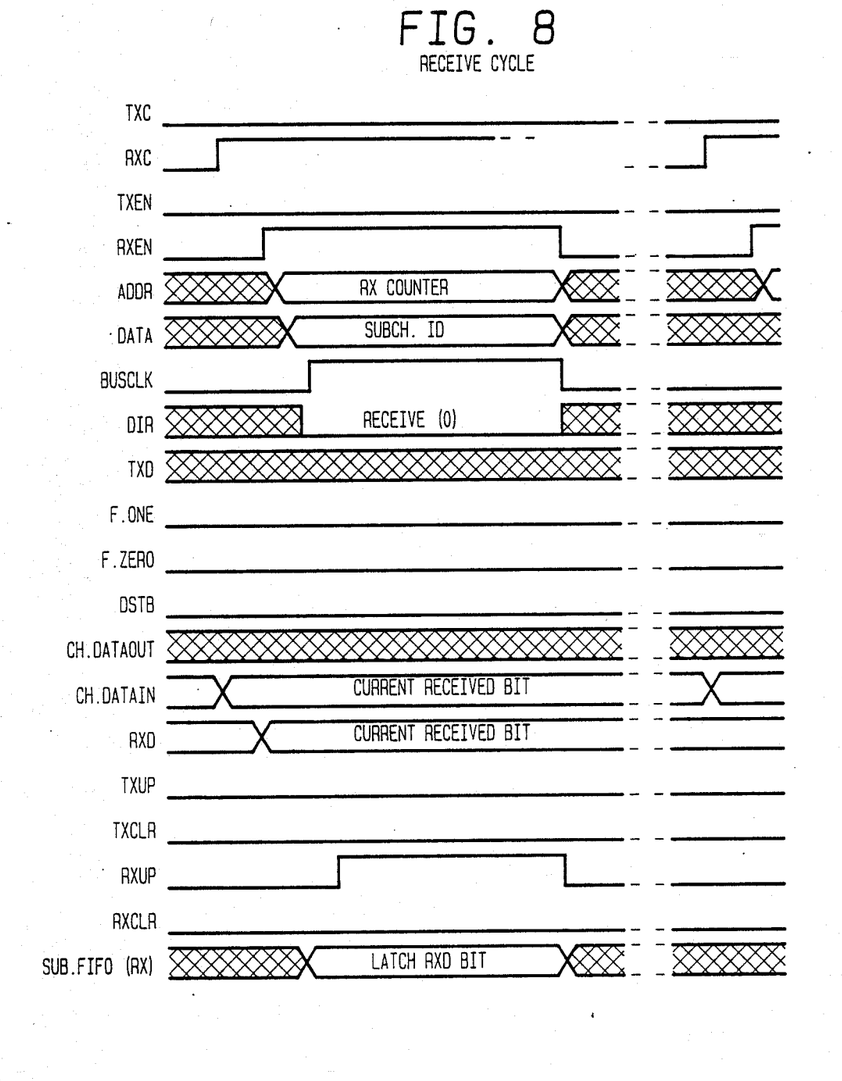
FIG. 8 shows the timing relationships between these various signals during a receive cycle.
Figure 9:
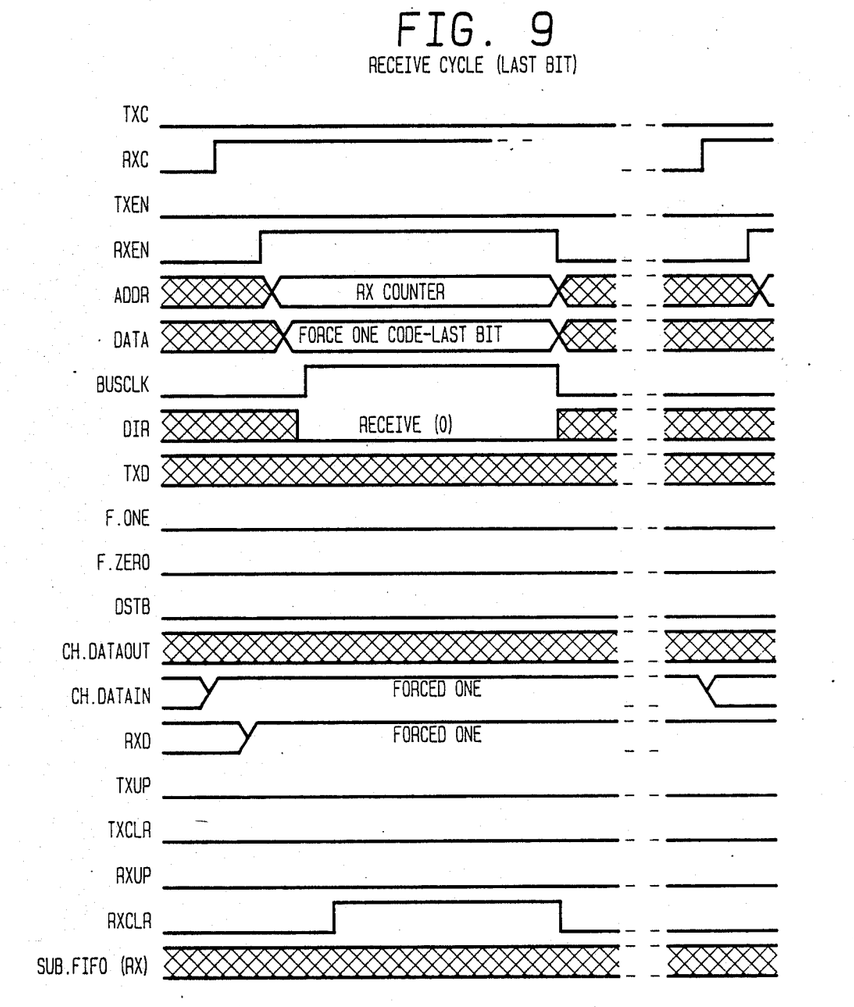
FIG. 9 shows the timing relationships between these various signals during the receive cycle of the last bit in the frame.

The timing diagrams in FIGS. 8 and 9 illustrate the timing relationships during a receive cycle, for a normal received bit and for the last bit in a frame, respectively. Data bits received on input channel 205 (CH.DATAIN timing line) are latched into flip-flop 326 in response to RXC pulses on lead 209 and presented on RXD lead 327 (RXD timing line) to microsequencer 303 and on bus 202 to the subchannel interfaces 201-0—201-11. In response to the leading edge of the RXC pulse, noted on the RXC timing line, microsequencer 303 enables RXEN lead 328 connected to the EN input of receive RX counter 329 (noted on RXEN timing line). RX counter 329 thereupon outputs its present count on ADDR leads 207 to which memory 204 responds on DATA leads 208 with either a subchannel ID code or one of the aforementioned special codes, as noted in the ADDR and DATA timing lines. Microsequencer 303 then sets DIR lead 310 for the receive direction (ZERO) and activates BUS CLK lead 311 (see DIR and BUSCLK timing lines).

Microsequencer 303 examines the code word returned by memory 204. If the word is a subchannel ID, then, as will be described, the received bit on RXD lead 325 is latched into the appropriate subchannel interface as noted on the SUB.FIFO(RX) timing line and, as noted on the RXUP timing line, microsequencer 303 pulses RXUP lead 330 to increment the count of RX counter 329. If the word is a special code, then microsequencer 303 compares the received bit on RXD lead 327 with the expected framing bit as indicated by the special code. If the received bit matches the expected bit and the expected bit is not the last bit in the frame, then microsequencer 303 pulses RXUP lead 330 to increment RX counter 329. If the received bit does not match the expected bit, then microsequencer 303 goes into an out-of-frame condition and pulses RXCLR lead 332 to clear RX counter 329 and restart counting. The reframe sequence will be described hereinafter.

FIG. 9 illustrates the timing relationships for a last frame bit. If the special code from memory 204 indicates the last frame bit, then the received bit is expected to be a ONE, as noted in the CH.DATAIN and RXD timing lines. In response to the last bit special code microsequencer 303 pulses RXCLR lead 332 (see RXCLR timing line) to clear RX counter 329 regardless of the actual received data bit.

As aforenoted, microsequencer 303 enters an out-of-frame condition whenever the received bit does not match the expected framing bit. In response, RX counter 329 is reset. Since the frame structure requires that the received bit be ZERO for the first i bit positions in the frame, RX counter 329 will be successively reset until i ZEROes are received, thereby assuring that the received data stream is in frame.

After all bit processing is complete in the receive direction, microsequencer 303 deactivates RXEN lead 328, BUS CLK lead 311, and DIR lead 310 thereby permitting kernel 203 to process the next bit to be transmitted on output channel 206.

In addition to functioning as traffic controller for the transmitted and received bits, kernel 203 generates a clock signal RxQ on lead 335 of bus 202 which is adaptively generated as a function of the frame parameters. As will be described, the subchannel interfaces 201—0—201-11 use the RxQ clock to derive the clock signals r(k) required by the associated subchannels. Memory interface 302 includes a latch 340 which has as an input the count output 308 of TX counter 307. The count of TX counter 307 is latched to the output of latch 340 in response to each TXCLR pulse just prior to being cleared. The count being latched to the output each frame (TXCLR is enabled only in response to the last frame bit) is thus always equal to the number of bits in the frame, or xQ as previously defined. The output of latch 340 thus always remains xQ as long as the frame is xQ bits long and is loaded into a counter 341. The count of counter 341 is decremented in response to each subsequent TXC pulse on lead 210 connected to the down DN input. When the count reaches zero a pulse is generated on the CY output connected to RxQ lead 335.

This same CY output is connected to the load LD input of counter 341 thereby reloading xQ into the counter each time the count hits zero. Since CY is pulsed once for every xQ TXC clock pulses, the frequency of pulses on RxQ lead 335 is equal to the frequency of TXC divided by xQ or R/xQ where R is the rate of the input/output channels 205 and 206. When the frame structure stored in memory 204 is changed such that each frame consists of a different number of bits xQ, RxQ adapts to a new frequency since the output of latch 340 automatically changes to the new value of xQ.

Figure 4:
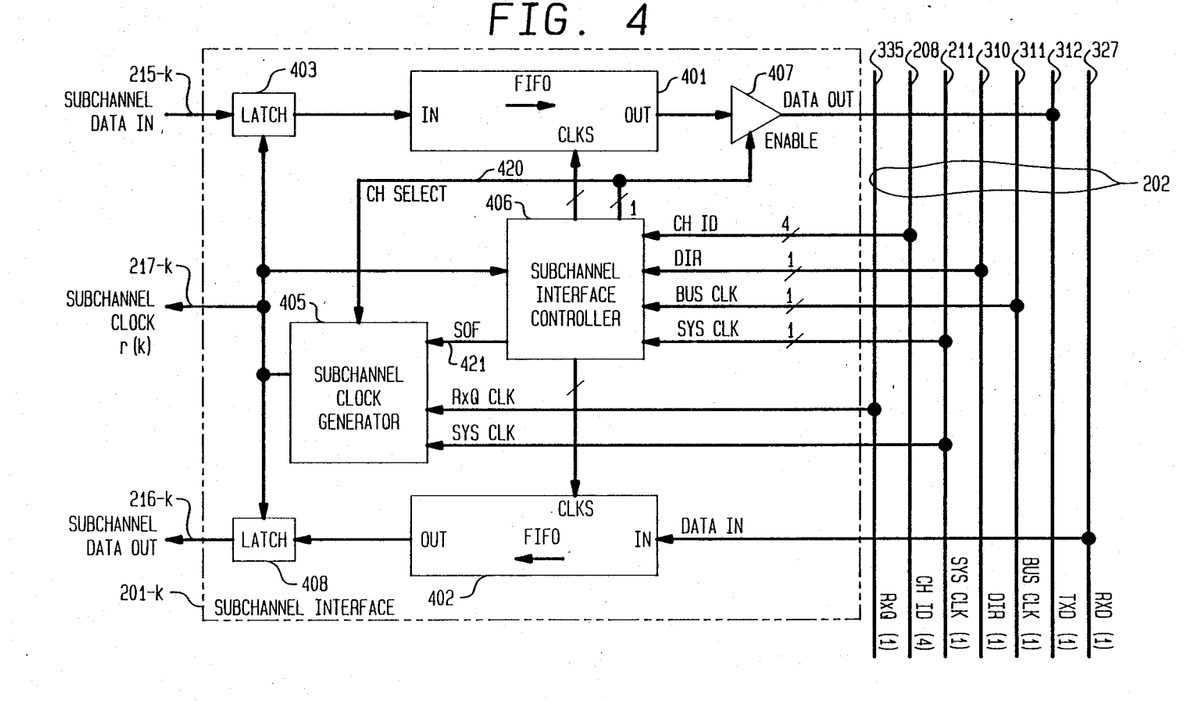
FIG. 4 is a block diagram of one subchannel interface of the multiplexer-demultiplexer of FIG. 2.

The operation of a subchannel interface 201-k is described with reference to FIG. 4. Each subchannel interface 201-k includes a transmit direction (onto channel 206) first-in-first-out (FIFO) buffer 401 and a receive direction (from channel 205) FIFO buffer 402. In the transmit direction data bits from the subchannel data input 215-k are sequentially entered in latch 403 which outputs bits to the input of FIFO 401 in response the subchannel clock signal r(k) generated by subchannel clock generator 405. As will be described, subchannel clock generator 405 automatically generates the clock signal at the frequency r(k) associated with that subchannel. FIFO 401 buffers the bits being read which are being clocked in response to a clock signal generated by subchannel interface controller 406.

Subchannel interface controller 406 monitors the code words on the CH ID leads 211 of bus 202 for the subchannel k code word or the special code indicating a last frame bit. When the subchannel k code is present, controller 406 determines from DIR lead 310 whether the subchannel is to transmit or receive a bit. When DIR lead 310 is set ONE (transmit), enablement of BUS CLK lead 311 triggers controller 406 to enable CH SELECT lead 420 and to clock out the oldest stored bit in FIFO 401 through gate 407 onto TXD lead 312 and to shift the data in FIFO 401, and move data in, in response to the subchannel clock r(k) on 217-k. When DIR lead 310 is set ZERO (receive), enablement of BUS CLK lead 311 triggers controller 406 to activate an input clock of FIFO 402 to read in the data bit on RXD lead 327. FIFO 402 sequentially stores the demultiplexed bits and clocks them, oldest first, onto the subchannel 216-k, in response to the subchannel clock r(k) on 217-k.

By storing the transmit and receive bits in FIFOs 401 and 402, respectively, data in the transmit and receive directions can be synchronized, allowing external circuits to operate in a synchronous, periodic manner while the data is buffered and placed into the outgoing multiplexed stream by the kernel as specified by the stored frame bit assignment scheme. The average rates of transfer will be equal for both the outgoing and incoming subchannel but data will be transmitted in a seemingly aperiodic manner, per bit.

Figure 5:
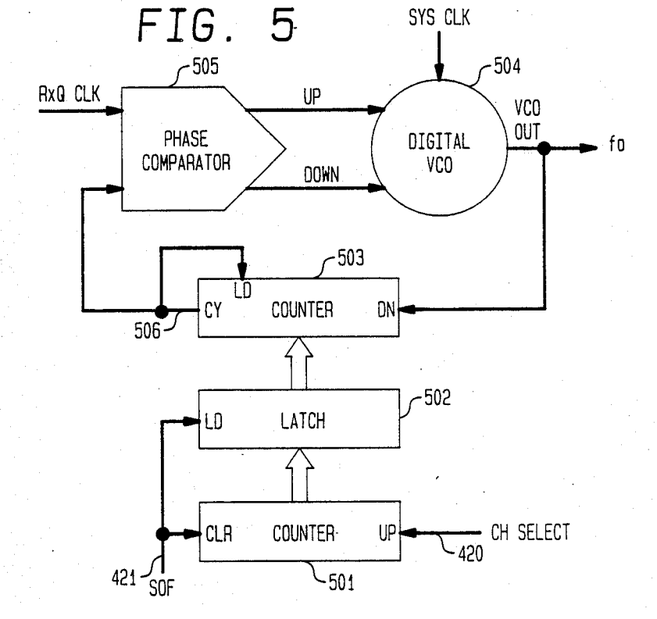
FIG. 5 is a block diagram of the subchannel clock generator of the subchannel interface of FIG. 4.

Subchannel clock generator 405 will be described with reference to FIG. 5. Clock generator 405 includes a digital phase locked loop having an output frequency fo which will be shown to be equal to r(k), the needed frequency of subchannel k. Clock generator 405 also includes counter 501 which is incremented by the CH SELECT lead 420 of subchannel interface controller each time the subchannel k is selected for transmission. When subchannel interface controller 406 detects the special code indicating the last frame bit in the transmit direction, it activates SOF lead 421. In response thereto, the contents of counter 501 are loaded into latch 502 and the count of counter 501 is cleared. Latch 502 thus holds the number of bits transmitted from the subchannel k during each frame which is equal, by definition, to xp(k). This value is loaded into counter 503 which divides the frequency fo of a conventional digital voltage controlled oscillator (VCO) 504 by the factor xp(k) in the same manner that counter 311 in memory interface 302 in FIG. 3 divided the frequency of TXC by the factor xQ. The CY output lead 506 of counter 503 is thus pulsed once for each xp(k) fo pulses, therefore having a frequency equal to fo/xp(k). A conventional phase comparator 505 compares this signal with the RxQ clock signal, which was previously shown to have a frequency R/xQ. Phase comparator 505 forces the frequency of VCO 504 up or down until the frequencies at both inputs to comparator are equal, or $$\frac{fo}{xp(k)} = \frac{R}{xQ} \qquad (1)$$

Thus fo is driven to Rp(k)/Q which is equal to the desired subchannel clock frequency r(k).

As the frequency of the RxQ clock signal is adaptive to changes in the frame structure, as heretofore discussed, the clock generator associated with each subchannel is adaptive to a new frame structure since the frequency divisor xp(k) in each subchannel automatically assumes a value equal to the number of bits assigned to that subchannel in the new frame structure.

The memory device 204 of the multiplexer-demultiplexer could be either a ROM or RAM. If a ROM is utilized, the frame structure would be static but could be modified to accommodate different rates as required by changing the ROM. If a limited set of different rates are needed, the ROM could hold several patterns which could be selected externally using a switch or single chip microcomputer. If a highly dynamic set of rates are required, RAM memory could be used and a microcomputer included which could calculate the frame parameters from the rates and configure the bit assignments for the new frame and alter the RAM contents for these new frame values. Although the invention was described in conjunction with an ij frame format, other frame formats in which the frame parameters are determined as a function of the main and subchannel rates could also be employed by the invention.

The above described embodiment is illustrative of the principles of the present invention. Other embodiments may be devised by those skilled in the art without departing from the spirit and scope of the present invention.

What is claimed is:

1. A multiplexer-demultiplexer for multiplexing a plurality of digital subchannels into a transmit bit stream on a fixed rate channel and for demultiplexing a receive bit stream from the fixed rate channel into the plurality of digital subchannels, the transmit and receive bit streams being organized in frames having a frame structure consisting of a fixed number of bits, the number of bits per frame being determined as a function of the rates of the digital subchannels and the rate of the fixed rate channel, said multiplexer-demultiplexer comprising, memory means for storing the bit assignment pattern of the frame structure, plural transmit and receive bit storage means, one transmit and one receive bit storage means associated with each one of the digital subchannels, each transmit bit storage means for storing bits from its associated digital subchannel to be multiplexed into the transmit bit stream and each receive bit storage for storing bits from the receive multiplexed bit stream to be distributed to its associated digital subchannel, bit distribution means connected to said memory means, said plural transmit and receive bit storage means, and the fixed rate channel, for selecting in accordance with said stored bit assignment pattern bits from said plural transmit bit storage means to form said transmit bit stream and for distributing in accordance with said stored bit assignment pattern bits in said receive bit stream to said plural receive bit storage means, and plural clocking means, one clocking means associated with each one of the digital subchannels for generating a clock signal that clocks bits between the one digital subchannel and the transmit and receive bit storage means associated with that one digital subchannel at the rate of the one subchannel, each of said plural clocking means each responsive to the frame structure for automatically generating its clock signal at the rate of the associated digital subchannel, wherein said multiplexer-demultiplexer is adaptive to the frame structure stored in said memory means as a function of the rates of the plural digital subchannels and the fixed rate channel.

2. A multiplexer-demultiplexer in accordance with claim 1 wherein each frame contains j i-tuples of bits where i and j are mathematically determined as a function of the rates of the plurality of digital subchannels and the rate of the fixed rate channel, each bit in one of the j-tuples being a framing bit set to a first predetermined binary digit, and one bit at one end of the other j−1 i-tuples being a framing bit set to an opposite second binary digit, and in the remaining (i−1)(j−1) bit positions an integral number of bits from each of the digital subchannels being distributed in a predetermined pattern, said memory means containing for each bit in the frame either a code indicating that the bit is assigned to one of the digital subchannels, a first special code indicating that the bit is one of the framing bits set to said first binary digit, a second special code indicating that the bit is one of the framing bits set to said second binary digit, or a third special code indicating that the bit is the framing bit set adjacent in time to said one j-tuple that contains in each bit position the framing bits set at said first binary digit.

3. A multiplexer-demultiplexer in accordance with claim 2 wherein said bit distribution means comprises a receive counting means for counting bits in each frame in the receive bit stream, and a transmit counting means for counting bits in each frame in the transmit bit stream, said receive counting means and said transmit counting means supplying their counts to said memory means, said bit distribution means receiving from said memory means in response to each count said code indicating one of the plurality of digital subchannels or one of said three special codes.

4. A multiplexer-demultiplexer in accordance with claim 3 wherein said bit distribution means further comprises means for generating a clock signal at the rate of said fixed rate channel divided by the number of bits in each frame, wherein said clock signal is adaptive to the rate of said fixed rate channel and the frame structure stored in said memory means.

5. A multiplexer-demultiplexer in accordance with claim 3 wherein said bit distribution means further comprises means for forming said transmit bit stream by selecting in accordance with the count of said transmit counting means and the associated code in said memory means either a bit stored in the transmit bit storage means associated with that code or a framing bit.

6. A multiplexer-demultiplexer in accordance with claim 3 wherein said bit distribution means further comprises means for generating a direction signal to indicate for each bit the transmit or receive direction, and said multiplexer-demultiplexer further comprises plural control means each one associated with one of the digital subchannels and each responsive to the particular code of its associated subchannel and said direction signal for clocking a bit between the transmit bit storage means or the receive bit storage means of that subchannel and said bit distribution means when said bit distribution means receives said particular code from said memory means.

7. A multiplexer-demultiplexer in accordance with claim 4 wherein each of said clocking means comprises controllable oscillator means for generating a first clocking signal, means for dividing said first clocking signal by the number of bits from the associated subchannel per frame, comparing means for comparing the divided first clocking signal with said clock signal at the rate of said fixed rate channel divided by the total number of bits per frame to generate a control signal, said control signal driving said oscillator means to output said first clocking signal at the rate of the associated subchannel, wherein said first clocking signal automatically adapts to a new subchannel rate when a new frame structure derived from the new subchannel rate is stored in said memory means.

8. A multiplexer-demultiplexer in accordance with claim 1 wherein said memory means comprises means for storing the bit assignment patterns of plural frame structures, each frame structure being determined from other combinations of rates of the digital subchannels and the fixed rate channel.

9. A multiplexer-demultiplexer in accordance with claim 1 wherein the bit assignment pattern of the frame structure stored in said memory means is replaceable with a bit assignment pattern of other frame structures determined from different rates of the digital subchannels and the fixed rate channel.

10. A multiplexer for multiplexing a plurality of digital subchannels into a transmit bit stream on a fixed rate channel, the transmit bit stream being organized in frames having a frame structure consisting of a fixed number of bits, the number of bits being determined as a function of the rates of the digital subchannels and the rate of the fixed rate channel, said multiplexer comprising, memory means for storing the bit assignment pattern of the frame structure, plural bit storage means each one associated with one of the digital subchannels, each storage means for storing bits from the one digital subchannel to be multiplexed into the transmit bit stream, bit distribution means connected to said memory means, said plural bit storage means, and the fixed rate channel, for selecting in accordance with said stored bit assignment pattern bits from said plural bit storage means to form said transmit bit stream, and plural clocking means, one clocking means associated with each of the digital subchannels for generating a clock signal that clocks bits between the one digital subchannel and the bit storage means associated with that one subchannel at the rate of the one subchannel, each of said plural clocking means responsive to the frame structure for automatically generating its clock signal at the rate of the associated digital subchannel, wherein said multiplexer is adaptive to the frame structure stored in said memory means as a function of the rates of the plural digital subchannels and the fixed rate channel.

11. A multiplexer in accordance with claim 10 wherein each frame contains j i-tuples of bits where i and j are mathematically determined as a function of the rates of the plurality of digital subchannels and the rate of the fixed rate channel, each bit in one of the j-tuples being a framing bit set to a first predetermined binary digit, and one bit at one end of the other j−1 i-tuples being a framing bit set to an opposite second binary digit, and in the remaining (i−1)(j−1) bit positions an integral number of bits from each of the digital subchannels being distributed in a predetermined pattern, said memory means containing for each bit in the frame either a code indicating that the bit is assigned to one of the digital subchannels, a first special code indicating that the bit is one of the framing bits set to said first binary digit, a second special code indicating that the bit is one of the framing bits set to said second binary digit, or a third special code indicating that the bit is the framing bit set adjacent in time to said one j-tuple that contains in each bit position the framing bits set at said first binary digit.

12. A multiplexer in accordance with claim 11 wherein said bit distribution means comprises transmit counting means for counting bits in each frame in the transmit bit stream, said transmit counting means supplying its count to said memory means, said bit distribution means receiving from said memory means in response to each count said code indicating one of the plurality of digital subchannels or one of said three special codes.

13. A multiplexer in accordance with claim 12 wherein said bit distribution means further comprises means for generating a clock signal at the rate of said fixed rate channel divided by number of bits in each frame, wherein said clock signal is adaptive to the rate of said fixed rate channel and the frame structure stored in said memory means.

14. A multiplexer in accordance with claim 12 wherein said bit distribution means further comprises means for forming said transmit bit stream by selecting in accordance with the count of said transmit counting means and the associated code in said memory means either a bit stored in the transmit bit storage means associated with that code or a framing bit.

15. A multiplexer in accordance with claim 12 further comprising plural control means each one associated with one of the digital subchannels and each responsive to the particular code of its associated subchannel for clocking a bit between the transmit bit storage means of that subchannel and said bit distribution means when said bit distribution means receives said particular code from said memory means.

16. A multiplexer in accordance with claim 13 wherein each of said clocking means comprises controllable oscillator means for generating a first clocking signal, means for dividing said first clocking signal by the number of bits from the associated subchannel per frame, comparing means for comparing the divided first clocking signal with said clock signal at the rate of said fixed rate channel divided by the total number of bits per frame to generate a control signal, said control signal driving said oscillator means to output said first clocking signal at the rate of the associated subchannel, wherein said first clocking signal automatically adapts to a new subchannel rate when a new frame structure derived from the new subchannel rate is stored in said memory means.

17. A multiplexer in accordance with claim 10 wherein said memory means comprises means for storing the bit assignment patterns of plural frame structures, each frame structure being determined from other combinations of rates of the digital subchannels and the fixed rate channel.

18. A multiplexer in accordance with claim 10 wherein the bit assignment pattern of the frame structure stored in said memory means is replaceable with a bit assignment pattern of other frame structures determined from different rates of the digital subchannels and the fixed rate channel.

19. A demultiplexer for demultiplexing a receive bit stream on a fixed rate channel into a plurality of digital subchannels, the receive bit stream being organized in frames having a frame structure consisting of a fixed number of bits, the number of bits being determined as a function of the rates of the digital subchannels and the rate of the fixed rate channel, said demultiplexer comprising, memory means for storing the bit assignment pattern of the frame structure, plural bit storage means each one associated with one of the digital subchannels, each storage means for storing bits from the receive multiplexed bit stream to be distributed to its associated subchannel, bit distribution means connected to said memory means, said plural bit storage means, and the fixed rate channel, for distributing in accordance with said stored bit assignment pattern bits in said receive bit stream to said plural bit storage means, and plural clocking means, one clocking means associated with each of the digital subchannels for generating a clock signal that clocks bits between the one digital subchannel and the bit storage means associated with that one subchannel at the rate of the one subchannel, each of said plural clocking means responsive to the frame structure for automatically generating its clock signal at the rate of the associated digital subchannel, wherein said demultiplexer is adaptive to the frame structure stored in said memory means as a function of the rates of said plural digital subchannels and fixed rate channel.

20. A demultiplexer in accordance with claim 19 wherein each frame contains j i-tuples of bits where i and j are mathematically determined as a function of the rates of the plurality of digital subchannels and the rate of the fixed rate channel, each bit in one of the j-tuples being a framing bit set to a first predetermined binary digit, and one bit at one end of the other j−1 i-tuples being a framing bit set to an opposite second binary digit, and in the remaining (i−1)(j−1) bit positions an integral number of bits from each of the digital subchannels being distributed in a predetermined pattern, said memory means containing for each bit in the frame either a code indicating that the bit is assigned to one of the digital subchannels, a first special code indicating that the bit is one of the framing bits set to said first binary digit, a second special code indicating that the bit is one of the framing bits set to said second binary digit, or a third special code indicating that the bit is the framing bit set adjacent in time to said one j-tuple that contains in each bit position the framing bits set at said first binary digit.

21. A demultiplexer in accordance with claim 20 wherein said bit distribution means comprises a receive counting means for counting bits in each frame in the receive bit stream, said receive counting means supplying its count to said memory means, said bit distribution means receiving from said memory means in response to each count said code indicating one of the plurality of digital subchannels or one of said three special codes.

22. A demultiplexer in accordance with claim 21 wherein said bit distribution means further comprises means for generating a clock signal at the rate of said fixed rate channel divided by number of bits in each frame, wherein said clock signal is adaptive to the rate of said fixed rate channel and the frame structure stored in said memory means.

23. A demultiplexer in accordance with claim 21 further comprising plural control means each one associated with one of the digital subchannels and each responsive to the particular code of its associated subchannel for clocking a bit between the receive bit storage means of that subchannel and said bit distribution means when said bit distribution means receives said particular code from said memory means.

24. A demultiplexer in accordance with claim 22 wherein each of said clocking means comprises controllable oscillator means for generating a first clocking signal, means for dividing said first clocking signal by the number of bits from the associated subchannel per frame, comparing means for comparing the divided first clocking signal with said clock signal at the rate of said fixed rate channel divided by the total number of bits per frame to generate a control signal, said control signal driving said oscillator means to output said first clocking signal at the rate of the associated subchannel, wherein said first clocking signal automatically adapts to a new subchannel rate when a new frame structure derived from the new subchannel rate is stored in said memory means.

25. A demultiplexer in accordance with claim 19 wherein said memory means comprises means for storing the bit assignment patterns of plural frame structures, each frame structure being determined from other combinations of rates of the digital subchannels and the fixed rate channel.

26. A demultiplexer in accordance with claim 19 wherein the bit assignment pattern of the frame structure stored in said memory means is replaceable with a bit assignment pattern of other frame structures determined from different rates of the digital subchannels and the fixed rate channel.

* * * * *